United States Patent
Liao

(10) Patent No.: US 9,138,960 B1
(45) Date of Patent: Sep. 22, 2015

(54) AIRTIGHT SHEATH HAVING OPENABLE AIR INLETS

(71) Applicant: Yaw-Shin Liao, Taipei (TW)

(72) Inventor: Yaw-Shin Liao, Taipei (TW)

( * ) Notice: Subject to any disclaimer, the term of this patent is extended or adjusted under 35 U.S.C. 154(b) by 0 days.

(21) Appl. No.: 14/251,651

(22) Filed: Apr. 14, 2014

(51) Int. Cl.
| B65D 81/03 | (2006.01) |
| B32B 3/26 | (2006.01) |
| B32B 7/04 | (2006.01) |
| B65D 30/24 | (2006.01) |
| B65D 81/05 | (2006.01) |

(52) U.S. Cl.
CPC ............. B32B 3/266 (2013.01); B32B 7/045 (2013.01); *B32B 2571/00* (2013.01); *B65D 31/145* (2013.01); *B65D 81/052* (2013.01)

(58) Field of Classification Search
CPC ........................... B65D 31/145; B65D 81/052
USPC ........................................ 206/522; 383/3, 44
See application file for complete search history.

(56) References Cited

U.S. PATENT DOCUMENTS

| 5,469,966 | A * | 11/1995 | Boyer .......................... 206/522 |
| 7,695,786 | B2 * | 4/2010 | Liao et al. .................... 206/522 |
| 7,934,522 | B2 * | 5/2011 | Liao et al. .................... 141/114 |
| 8,088,459 | B2 * | 1/2012 | Liao et al. .................... 206/522 |
| 2008/0080792 | A1 * | 4/2008 | Liao et al. ........................ 383/3 |
| 2008/0197041 | A1 * | 8/2008 | Jian ............................ 206/522 |
| 2009/0050509 | A1 * | 2/2009 | Liao et al. .................... 206/522 |
| 2013/0168286 | A1 * | 7/2013 | Liao et al. .................... 206/522 |
| 2013/0313152 | A1 * | 11/2013 | Liao et al. .................... 206/522 |

* cited by examiner

*Primary Examiner* — Luan K Bui

(57) ABSTRACT

An airtight sheath having openable air intakes includes two outer films and two inner films heat-sealed together, an air inflation path, and multiple air columns. Upper edges of the two inner films extend to upper edges of the two outer films. A plurality of air guiding portions are disposed on an inner surface of at least one of the inner films and coated with a heat-resistant material. A plurality of air guiding holes are formed on each of the inner films between the plurality of air guiding portions and upper edges of the two inner films. When being inflated from the air inflation path, air currents flow among the outer and inner films through the air guiding holes to quickly fill the air columns and generate pressure in the air columns to automatically press the inner films against each other for prevent air from leaking out of the air columns.

10 Claims, 5 Drawing Sheets

AIRTIGHT SHEATH HAVING OPENABLE AIR INLETS

BACKGROUND OF THE INVENTION

1. Field of the Invention

The present invention relates to an airtight sheath, and more particularly to an airtight sheath having openable air intakes for providing impact-resistant protection for an article.

2. Related Art

A traditional wrapping material is generally provided with a soft inner pad, such as foam, on a peripheral side thereof for protecting articles to be wrapped so as to prevent the articles from being damaged or broken by external vibration. However, the soft inner pad is required to be attached to the wrapping material with additional processes to avoid moving or coming off from the wrapping material, but the additional processes of attaching the soft inner pad are not only cumbersome but also costly to assembly.

In view of the above-mentioned drawbacks, an air inflatable structure is designed to resist impact, with air columns filled with air, and is capable of effectively protecting articles from being vibrated. A conventional air inflatable structure is known to have two pocket sheets and two valve sheets disposed in between and attached to the two pocket sheets, wherein a switch valve path and an air intake channel are formed therein. After being inflated with air, the air inflatable structure is inflated where the switch valve path is blocked to prevent air from leaking out. When air is filled in the air intake channel to inflate the air inflatable structure, the two pocket sheets are pulled outwards by inside air, while a switch valve is not pulled outwards in conjunction with the two pocket sheets. As a result, the two valve sheets of the switch valve are still attached together which causes the air intake channel to be closed and thus air is allowed to flow into the air inflatable structure again. Furthermore, because the two valve sheets are separately attached to outer sheets, assembly processes thus become cumbersome. Moreover, because the outer sheets and inner valve sheets are not assembled and manufactured together, mass production efficiency thereof is seriously affected as well as manufacturing cost. In another example of air inflatable structure, two outer films and two inner films are provided to form the structure, wherein the two inner films are formed with multiple heat-resistant materials, heat-sealing dots, and heat-sealing sides at predetermined locations thereof in order to form air inflation channels. After being inflated with air, the two inner films are inflated to attach to respective outer films and pull away air intakes of the air inflation channels so as to form air columns. However, the above-mentioned air inflatable structure has drawbacks as follows: the two inner films must be lower than the two outer films, and when the heat-sealing dots are not formed at exactly correct positions, the two inner films are to be folded inwards whereby blocking the air intakes causing unsuccessful air filling.

Consequently, it is imperative to improve an inflation structure to be capable of being manufactured with simple processes, automatically rapidly opening air intakes for continuously air charging without causing the block of air intake by inner films, preventing air from flowing reversely and leaking out when stopping air charging, and allowing outer films and inner films to be cut and processed together at the same time.

SUMMARY OF THE INVENTION

Accordingly, an objective of the present invention is to provide an airtight sheath having openable air intakes that are manufactured in simple processes and are capable of improving efficiency of mass-production.

Another objective of the present invention is to provide an airtight sheath having multiple air inflation openings for air inflating, and enabling air currents to quickly flow among the inner and outer films so as to automatically open air intakes when inflating, and automatically seal the air intakes to avoid air leakage.

To achieve the above-mentioned objectives, the airtight sheath having openable air intakes comprises two outer films respectively formed with a heat-sealing side for heat-sealing the two outer films together; two inner films attached to the two outer films by a first heat-sealing line, each of the inner films extending along the first heat-sealing line to opposite sides and upper edges of the two outer films; an air inflation path formed between the first heat-sealing line and the upper edges of the two outer films, one end of the air inflation path forming at least one air inflation opening for air inflating, and a buffering portion defined between the first heat-sealing line and bottoms of the outer films; a plurality of second heat-sealing lines disposed on the buffering portion for being heat-sealed to form multiple air columns; a plurality of air guiding portions disposed on an inner surface of at least one of the inner films and coated with a heat-resistant material, each of the air guiding portions extending into a respective air column and crossing the respective air column and the first heat-sealing line to the air inflation path; a plurality of air guiding holes formed on each of the inner films between the plurality of air guiding portions and upper edges of the two inner films and communicating with the air inflation path; and a plurality of heat-sealing blocks disposed between two adjacent inner film and outer film in the air inflation path for heat-sealing the two inner films with the two outer films in the air inflation path; wherein the upper edges of the two inner films and the upper edges of the two outer films are integrally heat-sealed together.

In accordance with one embodiment of the present invention, a plurality of current guiding heat-sealing lines are formed on one of the outer films in each of the multiple air columns for heat-sealing the adjacent inner film and outer film.

In accordance with another embodiment of the present invention, each one of the second heat-sealing lines is formed with at least one through hole for allowing the multiple air columns to communicate with each other in the buffering portion.

when air is discharged from the at least one air inflation opening of the air inflation path, air currents flow through the plurality of air guiding holes to inflate the two inner films and outer films, whereby each of the air guiding portions is pulled outward to form a current guiding channel between the two inner films, and each of the air intakes is formed in the current guiding channel facing the first heat-sealing line where air is capable of rapidly flowing from the air intakes to fill the multiple air columns in which pressure is generated to press the two inner films against each other in the air columns so as to prevent air from leaking out of the air columns.

The airtight sheath having openable air intakes of the present invention utilizes two inner films having the upper edges extending to the upper edges of the two outer films so as to facilitate attachment of the two outer films and the inner films at the same time, whereby simplifying processing procedures. Furthermore, the plurality of air guiding holes facilitate a quick inflation process and ensure air currents that flow among the outer films and the inner films when air is inflated from either one of the air inflation openings. Still further, because the outer films and the inner films in the air inflation path are precedingly heat-sealed together, the inner films are easy to be separated to automatically open the air intakes for inflating the air columns.

DESCRIPTION OF THE PREFERRED EMBODIMENTS

An airtight sheath having openable air intakes of the present invention is capable of being quickly inflated with air to function as an impact resistant structure, and is capable of automatically opening the air intakes and closing the air intakes after being inflated. The airtight sheath is feasible to have variable shapes, such as, for example, a single wall shape having multiple air columns arranged in a row, or a container shape for encompassing an article so as to provide impact resistance for the article.

Figure 1:
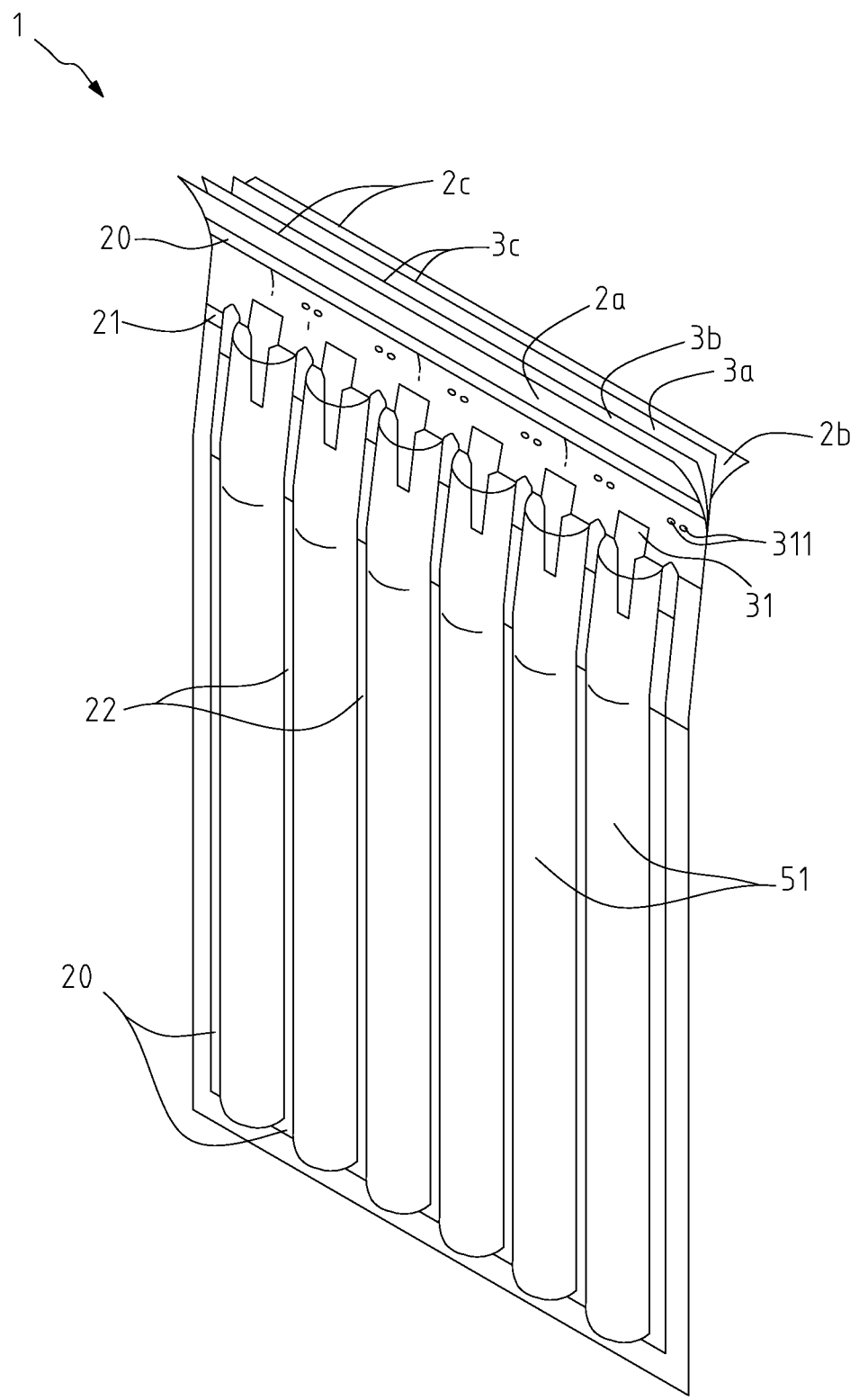
FIG. 1 is a schematic perspective view of an airtight sheath having openable air intakes of the present invention.
Figure 2:
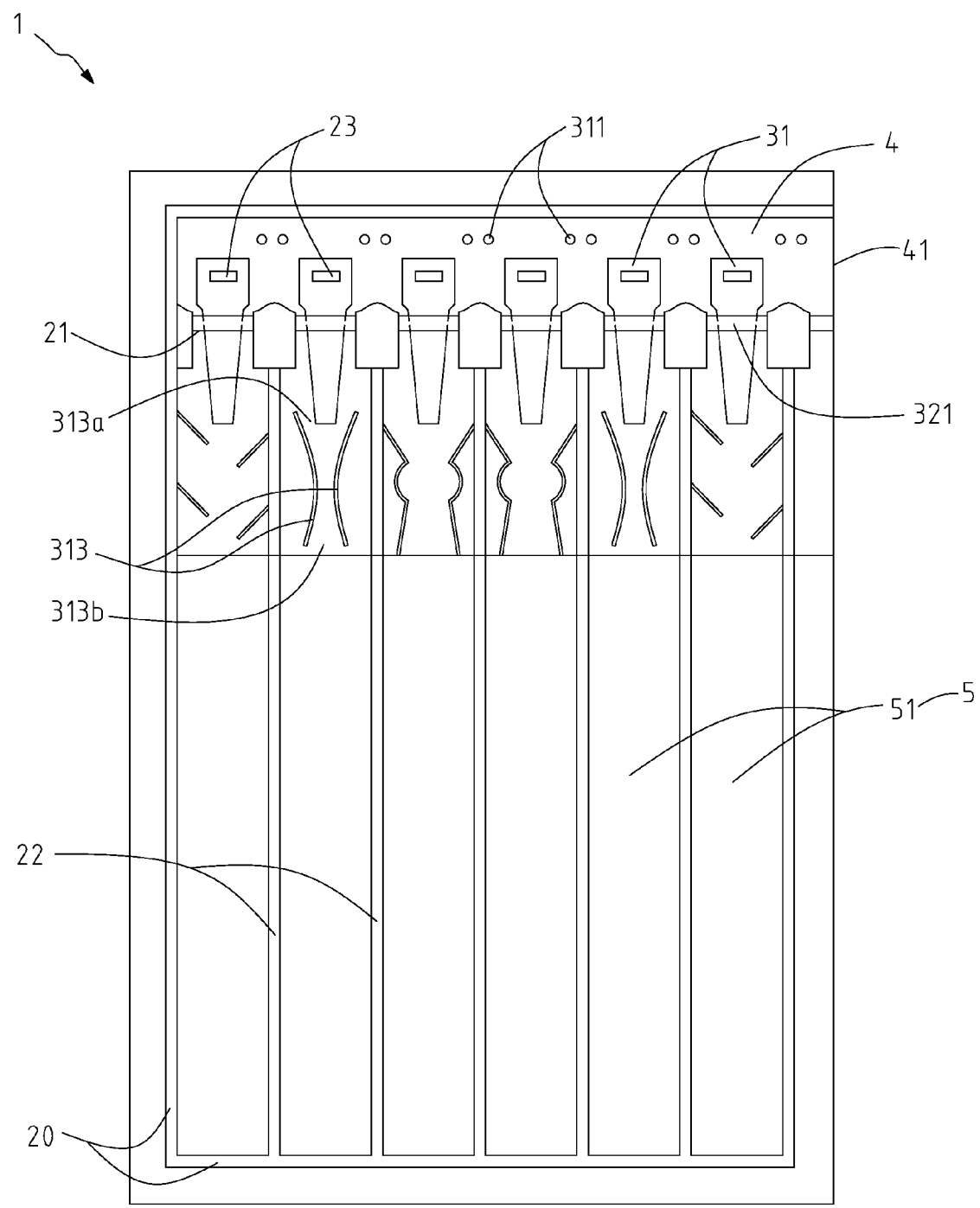
FIG. 2 is a front elevational view of FIG. 1.
Figure 3:
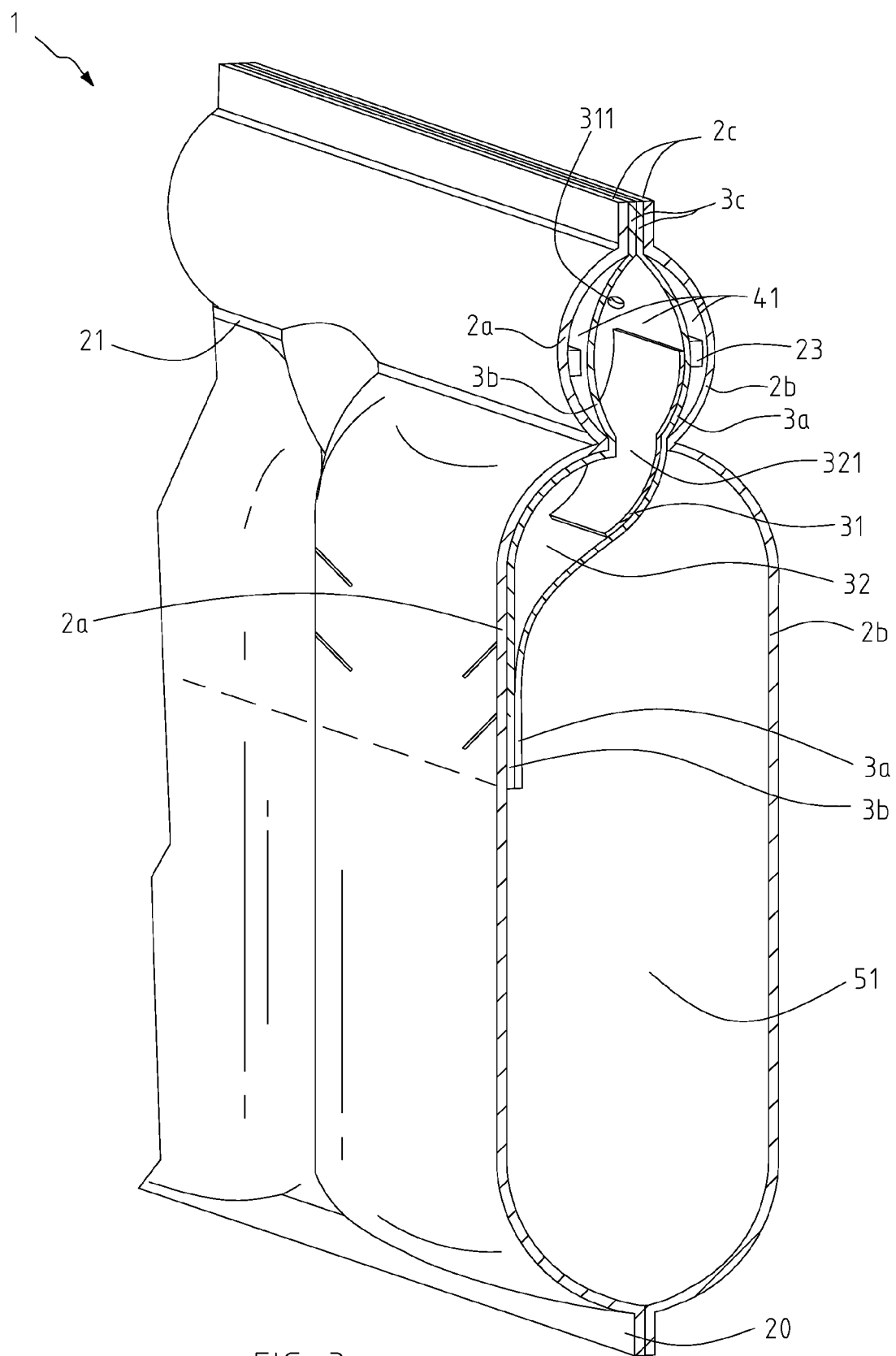
FIG. 3 is a schematic cross-sectional view of the airtight sheath of the present invention being inflated.

Referring to FIGS. 1 to 3 showing a preferable embodiment of an airtight sheath 1 of the present invention, the airtight sheath 1 has a shape of multiple air columns arranged in a single row, and comprises two outer films 2a and 2b, and two inner films 3a and 3b that are made of a transparent material, but not limited thereby. The two outer films 2a and 2b are corresponding to each other and are respectively provided with heat-sealing sides at peripheries of the two outer films 2a and 2b for being heat-sealed together. Additionally, a first heat-sealing line 21 is formed on the two outer films 2a and 2b for dividing the two outer films 2a and 2b into an air inflation path 4 and a buffering portion 5. The two inner films 3a and 3b are heat-sealed with the two outer films 2a and 2b with the first heat-sealing line 21, wherein a part of the two inner films 3a and 3b is located in the air inflation path 4, and another part thereof is located in the buffering portion 5. In this embodiment, a width of the two inner films 3a and 3b is thinner than a width of the two outer films 2a and 2b for facilitating the attachment of the inner films 3a and 3b and the outer films 2a and 2b.

The air inflation path 4 is formed between the first heat-sealing line 21 and upper edges 2c of the two outer films 2a and 2b. One end of the air inflation path 4 forming at least one air inflation opening 41 for air inflating. In this preferable embodiment, there are three air inflation openings 41, and one of which is formed between the two inner films 3a and 3b, and the other two air inflation openings 41 are respectively formed between the adjacent inner film 3b and outer film 2a, and the adjacent inner film 3a and outer film 2b. The present invention is to utilize an air compressor (not shown) connecting an inflation needle (not shown) inserted into one of the air inflation openings 41 for quickly inflating air therein. The buffering portion 5 is provided with a plurality of second heat-sealing lines 22 spaced apart from each other to heat-seal the two inner films 3a and 3b and the two outer films 2a and 2b for forming multiple air columns 51. The plurality of second heat-sealing lines 22 are respectively perpendicular to and extend to the first heat-sealing line 21, whereby the multiple air columns 51 and the air inflation path 4 are arranged in different direction so as to reinforce the strength of the airtight sheath 1. The multiple air columns 51 are arranged in a row. Furthermore, each one of the second heat-sealing lines 22 is formed with at least one through hole 221 for allowing the multiple air columns 51 to communicate with each other in the buffering portion 5. In other words, air discharges from either one of the multiple air columns 51 is capable of flowing to the other air columns 51 through the through holes 221.

Continuing referring to FIGS. 2 and 3, the two inner films 3a and 3b are corresponding to each other and respectively extend along the first heat-sealing line 21 to opposite sides and upper edges 2c of the two outer films 2a and 2b. In particular, a plurality of air guiding portions 31 are separately disposed on an inner surface of the inner film 3a, and are located relative to the multiple air column 51. Each of the air guiding portions 31 extends into a respective air column 51 and crosses the respective air column 51 and the first heat-sealing line 21 to the air inflation path 4, and is completely coated with a heat-resistant material. More specifically, a part of each air guiding portion 31 is located in the air inflation path 4, and another part thereof is located in the air column 51. The plurality of air guiding portions 31 are not affected by the first heat-sealing line 21 when heat sealing because of the heat-resistant material so that the air guiding portion 31 are not to be attached to another inner film 3b. On the other hand, the parts of the air guiding portions 31 in the air inflation path 4 do not extend to the upper edges 2c of the two outer films 2a and 2b in order for reducing the size of the air guiding portions 31 so as to lower a manufacturing and coating cost. It is particularly noted that upper and lower sides of the inner films 3a and 3b extend to the opposite left and right sides of the two outer films 2a and 2b, and upper edges 3c of the two inner films 3a and 3b extend to the upper edges 2c of the outer films 2a and 2b for facilitating heat-sealing attachment of the outer films 2a and 2b and the inner films 3a and 3b. That is, when mass producing the airtight sheaths 1, a large size of the outer films 2a and 2b and the inner films 3a and 3b are overlapped with each other and are capable of being cut at the same time to be separated into two units of the airtight sheaths 1, whereby simplifying the manufacturing processes.

Figure 4:
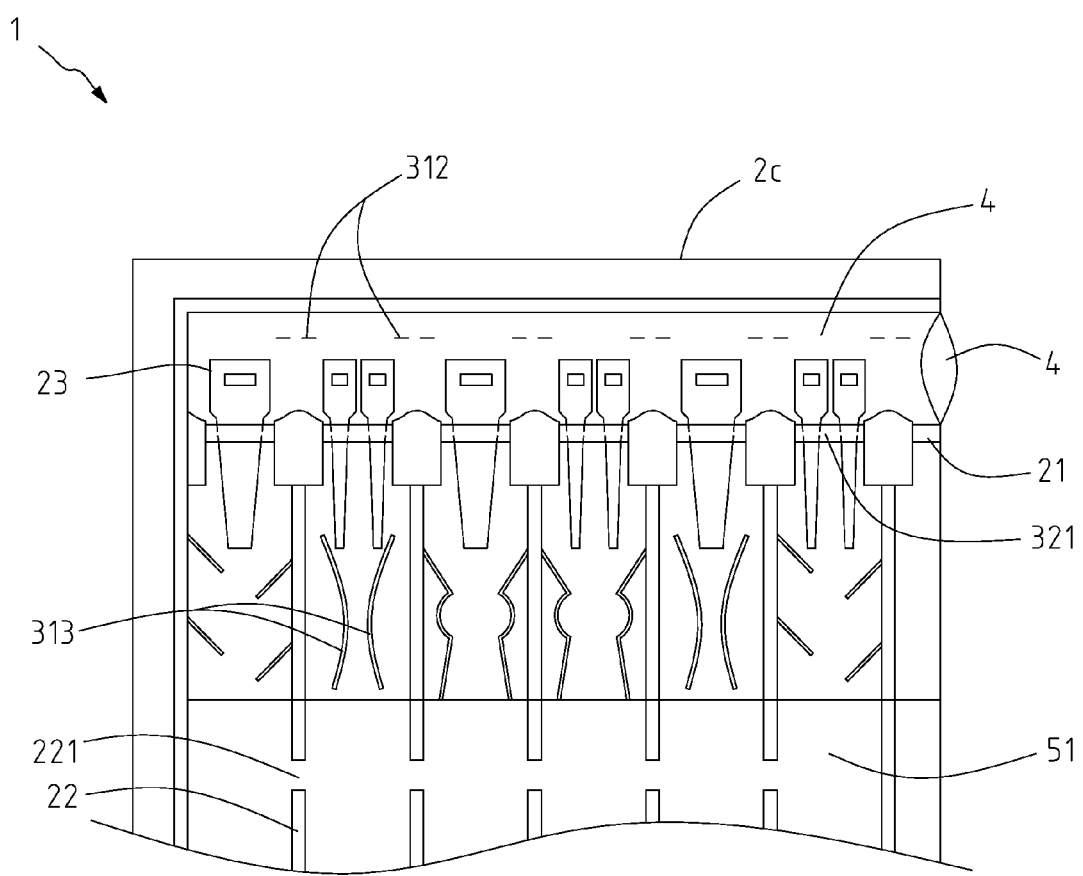
FIG. 4 is a schematic front elevational view of the airtight sheath according to another embodiment of the present invention showing a plurality of air guiding holes respectively having a cutting line shape.

Referring to FIGS. 2 and 3, a plurality of air guiding holes 311 are formed on each of the inner films 3a and 3b between the plurality of air guiding portions 31 and the upper edges 3c of the two inner films 3a and 3b and communicate with the air inflation path 4. The air guiding holes 311 are spaced apart from each other and arranged in line with each other for facilitating air currents discharging in the air inflation path 4. Referring to FIG. 4, in another embodiment, the plurality of air guiding holes 311 are shaped as cutting lines 312. When being inflated, the air inflation path 4 is filled with pressure which inflates the two inner films 3a and 3b and therefore opens the cutting lines 312 to allow air currents to flow therethrough until the air inflating stops. The cutting lines 312 are arranged in alignment with each other in one row or multiple rows.

Figure 5:
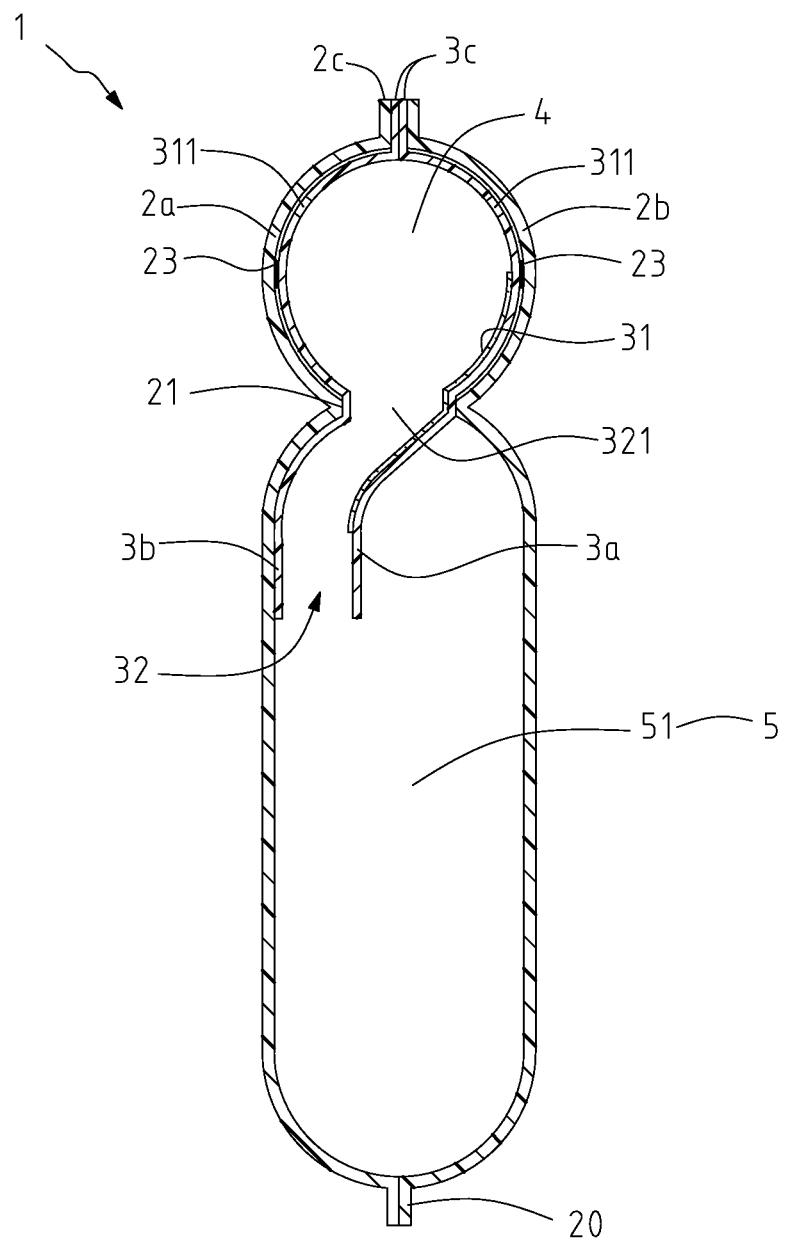
FIG. 5 is a schematic side cross-sectional view of the airtight sheath having openable air intakes being inflated.

Referring to FIG. 5 showing a schematic side cross-sectional view of the present invention, when inflating the airtight sheath 1, the inflation needle is inserted into one of the air inflation openings 41, and air discharges from the air inflation opening 41 into the air inflation path 4. It is noted that no matter which of the air inflation openings 41 is inserted with the inflating needle, air currents are capable of flowing through the plurality of air guiding holes 311 of the two inner films 3a and 3b so as to inflate the two inner films 3a and 3b in the air inflation path 4. As a result, each of the plurality of air guiding holes 311 is spaced apart from the opposite inner film 3b to form a current guiding channel 32, wherein an air intake 321 is formed in the current guiding channel 32 facing the first heat-sealing line 21 where air is capable of rapidly flowing from the air intake 321 to fill the buffering portion 5 and inflates the outer films 2a and 2b so as to form the multiple air columns 51. At the same time, pressure is generated in the air columns 51 and presses the two inner films 3a and 3b against each other in the air columns 51 so as to seal the current guiding channels 32 and to prevent air from leaking out of the air columns 51.

Alternatively, each of the multiply air columns 51 is capable of including multiple current guiding channels 32 for facilitating air currents discharging.

It is particularly noted that a plurality of heat-sealing blocks 23 are disposed between the two adjacent inner film 3b and outer film 2a, and between the two adjacent inner film 3a and outer film 2b, in the air inflation path 4 (as shown in FIGS. 3 and 5). The plurality of heat-sealing blocks 23 are spaced apart from each other for heat-sealing the two inner films 3a and 3b with the two outer films 2a and 2b in the air inflation path 4. In this manner, portions of the two inner films 3a and 3b are bonded with the adjacent outer films 2a and 2b so as to facilitate separation of the two inner films 3a and 3b when inflating, whereby allowing inflation air quickly directly flows in the current guiding channels 32.

Referring to FIG. 2, a plurality of current guiding heat-sealing lines 313 are formed on one of the outer films 2a in each of the multiple air columns 51 for heat-sealing the adjacent inner film 3b and outer film 2a before inflating. Every two of the plurality of current guiding heat-sealing lines 313 are arranged symmetrically and apart from each other in each air column 51, wherein two opposite air holes 313a and 313b are located at upper and lower portions of the two current guiding heat-sealing lines 313. The air hole 313a at the upper portion has a width larger than that of the air hole 313b at the lower portion so as to enable the pressure between the two current guiding heat-sealing lines 313 to be greater than pressure outside of the two current guiding heat-sealing lines 313. More specifically, every two of the current guiding heat-sealing lines 313 function as a unit to guide air currents, and each unit of the current guiding heat-sealing lines 313 has different shapes(as shown in FIG. 2). In one embodiment, the two current guiding heat-sealing lines 313 are curved in symmetrical to each other.

Accordingly, the airtight sheath 1 of the present invention utilizes two inner films 3a and 3b having the upper edges 3c extending to the upper edges 2c of the two outer films 2a and 2b so as to facilitate attachment of the two outer films 2a and 2b and the inner films 3a and 3b at the same time, whereby simplifying processing procedures. Furthermore, the plurality of air guiding holes 311 facilitate a quick inflation process and ensure air currents that flow among the outer films 2a and 2b and the inner films 3a and 3b when air is inflated from either one of the air inflation openings 4l. Furthermore, because the outer films 2a and 2b and the inner films 3a and 3b in the air inflation path 4 are precedingly heat-sealed together, the inner films 3a and 3b are easy to be separated to automatically open the air intakes 321 for inflating the air columns 51.

It is understood that the invention may be embodied in other forms within the scope of the claims. Thus the present examples and embodiments are to be considered in all respects as illustrative, and not restrictive, of the invention defined by the claims.

What is claimed is:

1. An airtight sheath having openable air intakes, comprising:
    two outer films respectively formed with a heat-sealing side for heat-sealing the two outer films together;
    two inner films attached to the two outer films by a first heat-sealing line, each of the inner films extending along the first heat-sealing line to opposite sides and upper edges of the two outer films;
    an air inflation path formed between the first heat-sealing line and the upper edges of the two outer films, one end of the air inflation path forming at least one air inflation opening for air inflating, and a buffering portion defined between the first heat-sealing line and bottoms of the outer films;
    a plurality of second heat-sealing lines disposed on the buffering portion for being heat-sealed to form multiple air columns;
    a plurality of air guiding portions disposed on an inner surface of at least one of the inner films and coated with a heat-resistant material, each of the air guiding portions extending into a respective air column and crossing the respective air column and the first heat-sealing line to the air inflation path;
    a plurality of air guiding holes formed on each of the inner films between the plurality of air guiding portions and upper edges of the two inner films and communicating with the air inflation path; and
    a plurality of heat-sealing blocks disposed between two adjacent inner film and outer film in the air inflation path for heat-sealing the two inner films with the two outer films in the air inflation path;
    wherein the upper edges of the two inner films and the upper edges of the two outer films are integrally heat-sealed together, and when air is discharged from the at least one air inflation opening of the air inflation path, air currents flow through the plurality of air guiding holes to inflate the two inner films and outer films, whereby each of the air guiding portions is pulled outward to form a current guiding channel between the two inner films, and each of the air intakes is formed in the current guiding channel facing the first heat-sealing line where air is capable of rapidly flowing from the air intakes to fill the multiple air columns in which pressure is generated to press the two inner films against each other in the air columns so as to prevent air from leaking out of the air columns.

2. The airtight sheath having openable air intakes of claim 1, wherein the plurality of air guiding holes respectively have a cutting line shape.

3. The airtight sheath having openable air intakes of claim 1, wherein a plurality of current guiding heat-sealing lines are formed on one of the outer films in each of the multiple air columns for heat-sealing the adjacent inner film and outer film.

4. The airtight sheath having openable air intakes of claim 3, wherein the current guiding heat-sealing lines are curved and symmetrical to each other, the current guiding heat-sealing lines in each air column forming two opposite air holes at upper and lower portions of the current guiding heat-sealing lines, wherein the air hole at the upper portion has a width larger than that of the air hole at the lower portion.

5. The airtight sheath having openable air intakes of claim 1, wherein each of the air columns is formed with multiple current guiding channels spaced away from each other.

6. The airtight sheath having openable air intakes of claim 1, wherein the two outer films and two inner films are heat-sealed through a thermal die.

7. The airtight sheath having openable air intakes of claim 1, wherein each one of the second heat-sealing lines is formed with at least one through hole for allowing the multiple air columns to communicate with each other in the buffering portion.

8. An airtight sheath having openable air intakes, comprising:

two outer films overlapping together with at least one inner film disposed in between the two outer films, upper edges of the two outer films being flush with an edge of the at least one inner film, portions of an inner surface of the at least on inner film being coated with a heat-resistant material;

an air inflation path formed between the two outer films, one end of the air inflation path forming three air inflation openings for air inflating;

multiple air columns being formed by heat-sealing the outer films and the at least one inner film; and the air intakes disposed between the air inflation path and the multiple air columns for communicating with the air inflation path and the multiple air columns;

wherein the at least one inner film is attached to the two outer films by heat-sealing, with the portions coated with the heat-resistant material not attached to the outer films, and when either one of the three air inflation openings is inflated, air flows through and inflates the air inflation path so as to automatically open the air intakes to allow air to flow into the multiple air columns, whereby pressure is generated in the multiple air columns to press the at least one inner film to block the air intakes and therefore seal the air columns.

9. The airtight sheath having openable air intakes of claim 8, wherein number of the at least one inner film is two, the heat-resistant material is coated on the inner surfaces of the two inner films, and the three air inflation openings are respectively disposed between the two inner films, and between the adjacent out film and inner film.

10. The airtight sheath having openable air intakes of claim 8, wherein the two outer films and the at least one inner film are heat-sealed through a thermal die.

* * * * *